United States Patent [19]

Kaiser et al.

[11] 3,846,476

[45] Nov. 5, 1974

[54] N-BENZYLOXYCARBONYL-DOPA DERIVATIVES

[75] Inventors: Ado Kaiser, Neu-Frenkendorf; Wolfgang Koch, Reihen; Marcel Scheer, Basel; Uwe Wolcke, Bottmingen, all of Switzerland

[73] Assignee: Hoffmann-La Roche Inc., Nutley, N.J.

[22] Filed: Oct. 14, 1971

[21] Appl. No.: 189,371

[30] Foreign Application Priority Data
Oct. 30, 1970 Switzerland.................. 16045/70

[52] U.S. Cl. ... 260/471 C, 260/453 AR, 260/462 R, 260/465 D, 260/470, 424/300
[51] Int. Cl.......................................... C07c 125/06
[58] Field of Search..................... 260/471 C, 465 D

[56] References Cited
UNITED STATES PATENTS
3,243,423    3/1966    Beyerman...................... 260/471 C Primary Examiner—Lorraine A. Weinberger
Assistant Examiner—L. A. Thaxton
Attorney, Agent, or Firm—Samuel L. Welt; Saxe, Jon S.; George M. Gould

[57] ABSTRACT

A method for preparing N-benzyloxycarbonyl-dopa derivatives useful as hypotensive, anti-pyretic and anti-Parkinson agents.

12 Claims, No Drawings

N-BENZYLOXYCARBONYL-DOPA DERIVATIVES

SUMMARY OF THE INVENTION

In accordance with this invention, a method has been provided for producing phenylalanine derivatives of the formula:

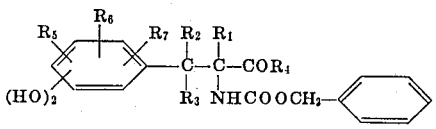

wherein $R_1$, $R_2$ and $R_3$ are, individually alkyl or hydrogen or $R_1$, taken together with $R_2$ or $R_3$, or $R_2$, taken together with $R_3$, form an alkylene bridge; $R_4$ is hydroxy, alkoxy, phenylalkoxy, amino, alkylamino or dialkylamino; $R_5$, $R_6$, and $R_7$ are hydrogen, halogen, alkyl, alkoxy, nitro, cyano or alkylthio and the two phenolic hydroxy groups being ortho to each other with the proviso that when $R_1$, $R_2$, $R_3$, $R_5$, $R_6$ and $R_7$ are hydrogen and $R_4$ is hydroxy, the compound is in the L-form, and pharmaceutically acceptable salts thereof.

The compounds of formula I can be prepared in accordance with this invention by subjecting a boric acid complex of a compound of formula I or pharmaceutically acceptable salts thereof to acid hydrolysis.

The compounds of formula I where $R_4$ is alkoxy or phenylalkoxy can be prepared by esterifying an acid of the formula:

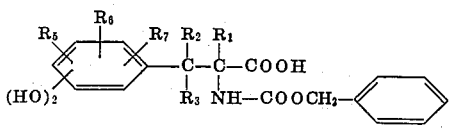

wherein $R_1$, $R_2$, $R_3$, $R_5$, $R_6$ and $R_7$ are as above and the two phenolic hydroxy groups are ortho to each other, or a pharmaceutically acceptable salt thereof.

On the other hand, the compound of the formula I where $R_4$ is hydroxy can be prepared by subjecting an ester of the formula

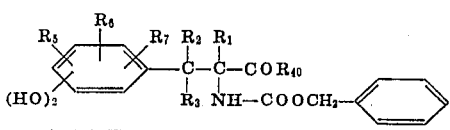

wherein $R_1$, $R_2$, $R_3$, $R_5$, $R_6$ and $R_7$ are as above; $R_{40}$ is alkoxy or phenylalkoxy and the two phenolic hydroxy groups are ortho to each other, or a pharmaceutically acceptable salt thereof, to mild basic hydrolysis or to treatment with ammonia or with an alkyl- or dialkylamine.

On the other hand, the compound of formula I can be prepared by treating an isocyanate of the formula

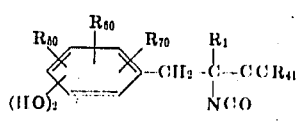

wherein $R_1$ is as above; $R_{50}$, $R_{60}$ and $R_{70}$ are hydrogen, halogen, alkyl, alkoxy, cyano or alkylthio; and $R_{41}$ is hydroxy, alkoxy, phenylalkoxy or dialkylamino; and the two hydroxy groups are ortho to each other;

or pharmaceutically acceptable salts thereof with benzyl alcohol.

On the other hand, the compound of the formula I where $R_4$ is hydroxy, alkoxy or phenylalkoxy can be prepared by subjecting a malonic acid ester of the formula:

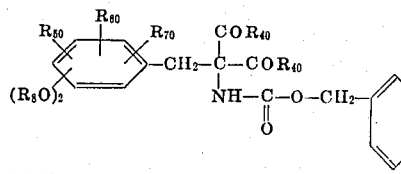

wherein $R_{40}$, $R_{50}$, $R_{60}$ and $R_{70}$ are as above and $R_6$ is lower alkanoyl or benzoyl and the two $R_6O$-groups are ortho to each other, to mild basic hydrolysis followed by decarboxylation.

On the other hand, the compound of formula I can be prepared by reacting a compound of the formula:

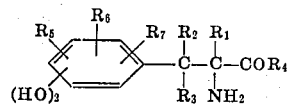

wherein $R_1$, $R_2$, $R_3$, $R_4$, $R_5$, $R_6$ and $R_7$ are as above; and the two hydroxy groups are ortho to each other;

and pharmaceutically acceptable salts thereof, with a compound of the formula

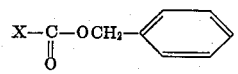

wherein X is a reactive functional derivative of an acid.

Among the compounds of formula I, there are included new compounds of the formula:

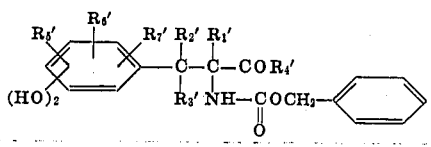

wherein $R_1'$, $R_2'$ and $R_3'$, individually, are hydrogen or alkyl or $R_1'$; taken together with $R_2'$ or $R_3'$ or $R_2'$, taken together with $R_3'$ form an alkylene bridge; $R_4'$ is hydroxy, alkoxy, phenylalkoxy, amino, alkylamino or dialkylamino; $R_5'$, $R_6'$ and $R_7'$ are hydrogen, halogen, alkyl, alkoxy, nitro, cyano, and alkylthio; and the two phenolic hydroxy groups are ortho to each other and with the proviso that at least one of $R_1'$, $R_2'$, $R_3'$, $R_5'$, $R_6'$ and $R_7'$ is other than hydrogen when $R_4'$ is hydroxy, or pharmaceutically acceptable salts thereof which are useful as hypotensive, anti-pyretic and anti-Parkinson agents.

DETAILED DESCRIPTION OF THE INVENTION

In the compounds of formulae I, I-A, II, III, IV, V, and VI, wherein $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_{40}$, $R_{41}$, $R_{50}$, and $R_{60}$ and $R_{70}$ are aliphatic hydrocarbon groups such as alkyl, alkylene, alkoxy, alkylthio, phenylalkoxy, alkylamino, these aliphatic hydrocarbon groups contain from 1 to 18 carbon atoms. In the starting materials of formulae II, III, IV, V and VI or the boric acid complex of formula I where $R_4$ and $R_{41}$ are hydroxy and either $R_1$, $R_2$, $R_3$, $R_5$, $R_6$ or $R_7$ are hydrogen, or $R_1$, $R_{50}$, $R_{60}$, and $R_{70}$ are hydrogen, these starting materials are in the L-form.

The preferred phenylalanine derivatives of formulae I or I-A, provided by this invention, are those which are present in the L- or DL-form.

The aforementioned aliphatic groups can be straight chain or branched chain. The alkyl groups preferably contain 1 to 7 carbon atoms such as, for example, methyl, isopropyl, n-hexyl and n-heptyl. The alkylene groups preferably contain from 1 to 6 carbon atoms such as, for example, methylene, pentamethylene and hexamethylene. The alkoxy groups preferably contain from 1 to 7 carbon atoms such as, for example, methoxy, isopropoxy. n-hexyloxy and n-heptyloxy. The halogen atom can be fluorine, chlorine, bromine or iodine atom, with chlorine and bromine being preferred.

The compounds of formula I form salts with any conventional pharmaceutically acceptable base. Among the preferred salts of formula I are included the disodium, dipotassium and diammonium salts.

A preferred group of the phenylalanine derivatives provided by the present invention comprises those compounds of formula I in which $R_1$ represents a hydrogen atom or the methyl group, $R_2$, $R_3$ and $R_5$–$R_7$ each represent a hydrogen atom and $R_4$ represents a hydroxy group and the two phenolic hydroxy groups are present in the 3,4-position, and salts thereof.

Interesting phenylalanine derivatives provided by the present invention are:

N-benzyloxycarbonyl-L-dopa [N-benzyloxycarbonyl-L-3-(3,4-dihydroxyphenyl)-alanine] as well as its methyl and benzyl ester and N-benzyloxycarbonyl-L-α-methyldopa
and pharmaceutically acceptable salts of these compounds.

The boric acid complex of a compound of formula I or pharmaceutically acceptable salt thereof used as the starting material in one embodiment of the present process can be prepared as follows.

A solution of a dihydroxyphenylalanine derivative of formula VI hereinbefore or of a salt thereof is treated with boric acid or a borate salt while maintaining a pH value of at least about 7, preferably from 7 to 13. This treatment prepares the boric acid complex of the compound of formula IV wherein both phenolic hydroxy groups are esterified with boric acid. Borax is preferably used to form this complex, but other salts of boric acid such as the alkali metal metaborates (e.g., sodium metaborate) and alkali metal pentaborates (e.g., potassium pentaborate) can also be used. Water is preferably employed as the solvent, but mixtures of water with an inert organic solvent such as, for example, tetrahydrofuran, dioxane, dimethyl sulfoxide or dimethylformamide can also be used. The treatment is preferably carried out at a temperature between about 0°C. and about 70°C. The treatment is preferably carried out while maintaining a pH value between about 7 and 13, this being expediently effected by the addition of caustic alkali or an organic base such as triethylamine or pyridine.

By the reaction of a dihydroxyphenylalanine derivative of formula VI or of a salt thereof with boric acid or with a borate salt in the foregoing manner there is obtained a boric acid complex of a compound of formula VI or a salt thereof wherein the two phenolic hydroxy groups are esterified with boric acid. This boric acid complex is subsequently treated with an agent for furnishing the benzyloxycarbonyl group such as a compound of formula VII. In this manner, the desired starting material, i.e., a boric acid complex of a compound of formula I or a salt thereof is obtained. This treatment can be carried out under the conditions usually employed for acylation reactions. For example, the boric acid complex obtained can be reacted with the corresponding acid halide, preferably the chloride or bromide, or with the corresponding acid anhydride or acid azide. According to another procedure, the boric acid complex can be treated with an activated ester. The acid residue of the activated ester yields the benzyloxycarbonyl group which is to be introduced. For example, the compound of formula VII can be an ester of

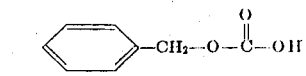

with N-hydroxysuccinimide, N-hydroxyphthalimide or p-nitrophenol. The medium, temperature and pH employed for the introduction of the benzyloxycarbonyl group are preferably the same as are employed in the preparation of a boric acid complex of a compound of formula VI.

The preparation of a boric acid complex of a compound of formula I or of a salt thereof is preferably effected in situ starting from a phenylalanine derivative of formula VI. The boric acid complex of a compound of formula I or of a salt thereof obtained is preferably subjected directly in solution, i.e., without isolation, to acid hydrolysis in accordance with the process of this invention to produce the compound of formula I.

The acid hydrolysis of the boric acid complex of a compound of formula I or of a salt thereof is preferably carried out in solution, with an aqueous solution being especially preferred. Preferably, a basic aqueous solution prepared in the manner described earlier is adjusted to a pH of about 1–4 with an acid. The boric acid complex is thereby cleaved and the desired compound of formula I is obtained. As acid agents there are preferably used mineral acids such as sulfuric acid, hydrochloric acid, phosphoric acid, etc., as well as organic acids such as mono- or polybasic alkanecarboxylic acids (for example, formic acid, acetic acid, trichloroacetic acid, citric acid, tartaric acid and oxalic acid). The same solvents and the same temperatures as employed in the preparation of the boric acid complex of a compound of formula VI can be employed in this acid hydrolysis.

The acid hydrolysis of a boric acid complex of a compound of formula I yields a selectively N-benzyloxycarbonylated phenylalanine compound of formula I in a particularly simple manner. The phenolic hydroxy groups present in the boric acid complex are protected against attack by the agent furnishing the benzoyloxycarbonyl group and, to a large extent, against oxidation by atmospheric oxygen.

The esterification of an acid of formula II in accordance with another embodiment of the present process can be carried out by any conventional method of esterification. In accordance with one embodiment of this invention, the acid of formula II is reacted with the corresponding diazo compound, for example, with diazomethane, diazoethane, etc. This reaction is preferably carried out in the presence of an inert organic solvent such as diethyl ether, tetrahydrofuran, dioxane, dimethylformamide, methylene chloride or ethyl acetate and at a temperature between about 0°C. and the boiling point of the reaction mixture. The esterification of an acid of formula II can also be carried out by treatment with a base, especially with a substituted organic base such as triethylamine or dicyclohexylamine, and subsequent reaction of the salt obtained with a compound of the formula $R^9Z$ or $(R^9)_2SO_4$, wherein $R^9$ represents an alkyl or phenylalkyl group and Z represents a leaving atom or group (for example, a halogen atom especially a chlorine, bromine or iodine atom, or a substituted sulfonyloxy group such as a methanesulfonyloxy, benzenesulfonyloxy, toluenesulfonyloxy or p-bromo-benzenesulfonyloxy group). This reaction is preferably carried out in the presence of an inert organic solvent; for example, in dimethylformamide, dimethylsulfoxide or tetrahydrofuran. The reaction is preferably carried out at a temperature between about 0°C. and the boiling point of the reaction mixture. The esterification of an acid of formula II can also be carried out by reaction with the corresponding alcohol, especially in the presence of an acidic catalyst such as hydrochloric acid, sulfuric acid, p-toluenesulfonic acid or thionyl chloride. There is preferably used a large excess of the alcohol. The excess alcohol can simultaneously serve as the solvent. The temperature is not critical, but it preferably lies between about 0°C. and the boiling point of the reaction mixture.

The mild basic hydrolysis of an ester of formula III in accordance with a further embodiment of the present process to give a corresponding acid of formula I can be carried out by means conventionally used for mild basic hydrolysis. Generally this hydrolysis is carried out by treatment of an aqueous or lower alkanolic solution of the ester of formula III, optionally in admixture with an inert organic solvent such as tetrahydrofuran or dioxane, with a dilute inorganic base (e.g., caustic soda, caustic potash or ammonia) or with a quaternary ammonium hydroxide such as, for example, tetramethylammonium hydroxide. The mild basic conditions for the hydrolysis are achieved by the use of the organic base or of the quaternary ammonium hydroxide in not more than about 50% by weight excess as well as by carrying out the hydrolysis at a temperature between about 0°C. and 50°C. The mild basic hydrolysis can also be carried out using non-quaternary, organic bases such as aqueous triethylamine or aqueous pyridine, in which case these bases can be used in a large excess.

The treatment of an ester of formula III with ammonia or an alkyl- or dialkylamine to give a corresponding amide of formula I can be carried out, for example, in an inert organic solvent (e.g., a lower alkanol, tetrahydrofuran, dioxane or dimethyl sulfoxide). If desired, the treatment can be carried out using a large excess of ammonia or amine, the latter simultaneously serving as the solvent. The treatment is preferably carried out at a temperature between about −40°C. and +100°C. when ammonia or a volatile amine is used, it is expedient to carry out the treatment in a closed system; for example, at up to 50 atmospheres (gauge).

The isocyanates of formula IV employed as starting materials in yet another embodiment of the present process can be prepared, for example, by reacting a correspondingly substituted benzyl halide in which the two phenolic hydroxy groups are protected by benzyl groups with an alkali metal salt (for example, the sodium salt) of a correspondingly substituted malonic acid ester in an inert organic solvent (e.g., an alkanol, benzene or dimethylformamide) at an elevated temperature. The reaction product obtained in subsequently subjected to a catalytic hydrogenation (for example, with the aid of hydrogen and palladium) in order to remove the benzyl protecting groups. By treatment of the product obtained with an approximately equimolar amount of hydrazine, one of the two ester groups is converted into the hydrazide group. An acid hydrazide thus obtained is then converted by treatment with sodium nitrite into the corresponding acid azide which is converted into the corresponding isocyanate of formula IV in which $R_{41}$ represents an alkoxy or phenylalkoxy group by heating in an inert solvent. If a corresponding acid or a corresponding amide of formula IV is desired, the remaining ester group in the acid hydrazide mentioned earlier is cleaved off in a manner known per se by saponification and, if desired, the acid obtained can be converted into the corresponding dialkylamide in a manner known per se by amidation. The acid hydrazides thus obtained are converted into the corresponding isocyanates of formula IV as described earlier.

The treatment of an isocyanate of formula IV with benzyl alcohol is preferably carried out in an inert organic solvent such as benzene, toluene, tetrahydrofuran or a lower alkanol. The treatment is preferably carried out at a temperature between about 0°C. and the boiling point of the mixture.

The malonic acid esters of formula V employed as starting materials in yet a further embodiment of the present process can be prepared, for example, by condensing a correspondingly substituted benzyl halide in which the two phenolic hydroxy groups are protected by the appropriate acyl groups with an alkali metal salt, preferably the sodium salt, of a corresponding benzyloxycarbonylaminomalonic acid ester in an inert organic solvent (for example, in dimethyl sulfoxide or dimethylformamide).

The mild basic hydrolysis of a malonic acid ester of formula V is preferably carried out using a dilute inorganic base such as caustic soda, caustic potash or ammonia, or with a quaternary ammonium hydroxide such as tetramethylammonium hydroxide. A lower alkanol such as ethanol, aqueous tetrahydrofuran or aqueous dioxane is preferably used as the solvent. The hydrolysis should be carried out under mild conditions so that the benzyloxycarbonyl group is not attacked. This is achieved by carrying out the hydrolysis at a temperature preferably between about 0°C. to about 50°C. and by using not more than about a 10–20% molar excess of inorganic base per ester group to be hydrolyzed. Depending on whether about 3 mol or 4 mol of the inorganic base are used per mol of malonic acid ester starting material of formula V, one or both —$COR_{40}$ groups are converted into carboxy groups, the esterified phenolic hydroxy groups being simultaneously converted into the free hydroxy groups in each case.

The free acid obtained by neutralization of the salt obtained is subsequently decarboxylated. This decarboxylation is preferably carried out by heating at about 50°–150°C. in an inert organic solvent (for example, tetrahydrofuran, dioxane, dimethyl sulfoxide, dimethylformamide, toluene or a lower alkanol) or in water, optionally in the presence of a catalytic amount of a sulfonic acid such as p-toluenesulfonic acid. In so doing, a carboxy group is cleaved off and, depending on the amount of inorganic base used in the hydrolysis aforesaid, an ester or an acid of formula I is obtained.

The reaction of a compound of formula VI with an agent furnishing the benzyloxycarbonyl group, i.e., the compound of formula VII, in accordance with a still further embodiment of the present process can be carried out, for example, in the presence of an aqueous base such as caustic alkali (for example, caustic soda or caustic potash) at a pH about 10. In accordance with a preferred embodiment of this invention, X can be a halide, preferably the chloride, azide or acid anhydride or an activated ester such as disclosed hereinbefore. This reaction is carried out at a temperature between 0°C. and 70°C. Where —$COR_4$ represents an ester group, this is converted into the carboxy group in this reaction.

The compounds of formula I contain an N-benzyloxycarbonyl group which can be cleaved off under strongly acidic conditions, especially at elevated temperatures. With respect to this group, care should therefore be taken in the working up of the product of the present process that the product is not strongly acidified or strongly acidified and heated, because strongly acidic conditions, especially in conjunction with elevated temperatures, can lead to a partial or complete cleavage of the N-benzyloxycarbonyl group with a consequential reduction in yield.

Racemates of formula I can be resolved; for example, by subjecting an acid of formula I to a fractional crystallization with an optically active base such as quinine, brucine, dehydroabietylamine (+)- or (−)-ephedrine or (+)- or (−)-α-methylbenzylamine. The optically active forms can, however, also be obtained by using pure, optically active starting materials in the process.

The phenylalanine derivatives of formulas I and I-A provided by the present invention (especially those which are present in the L-form) are pharmacodynamically active. They are distinguished by manifold actions on the nervous system. In particular, they possess hypotensive, antipyretic and anti-Parkinson properties.

The phenylalanine derivatives of formulas I and I-A provided by the present invention can be used in the form of pharmaceutical preparations which contain them in association with a compatible pharmaceutical carrier. This can be an organic or inorganic inert carrier material suitable for enteral or parenteral administration such as, for example, water, gelatin, gum arabic, lactose, starches, magnesium stearate, talc, vegetable oils, polyalkylene glycols, petroleum jelly, etc. The pharmaceutical preparations can be made up in a solid form (e.g., as tablets, dragees, suppositories or capsules) or in a liquid form (e.g., as solutions, suspensions or emulsions). The pharmaceutical preparations may be sterilized and/or may contain adjuvants such as preserving, stabilizing, wetting or emulsifying agents, salts for varying the osmotic pressure or buffers. They can also contain other therapeutically valuable substances.

A pharmaceutical preparation in dosage unit form can expediently contain about 10 mg. to about 1000 mg. of active ingredient (i.e., a phenylalanine derivative provided by the invention).

The pharmaceutical preparations can also contain one or more peripheral decarboxylase inhibitors, in which case a decrease in the amount of active ingredient to be administered becomes possible. As such decarboxylase inhibitors there can be used all pharmaceutically acceptable substances which inhibit the decarboxylase in the extracerebral organs and thereby prevent the decarboxylation of the active ingredient in these organs.

A compound of the general formula

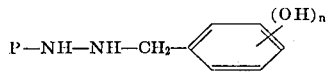

wherein P is hydrogen, amino-(lower alkanoyl) or amino-(hydroxy-lower alkanoyl) and n is an integer from 2 to 3 or a pharmaceutically acceptable salt thereof, can be used as the decarboxylase inhibitor. Examples of such decarboxylase inhibitors are:

$N^1$-D,L-seryl-$N^2$-(2,3,4-trihydroxybenzyl)-hydrazide, $N^1$-L-seryl-$N^2$-(2,3,4-trihydroxybenzyl)-hydrazide,
$N^1$-glycyl-$N^2$-(2,3,4-trihydroxybenzyl)-hydrazide,
$N^1$-D,L-tyrosyl-$N^2$-(2,3,4-trihydroxybenzyl)hydrazide or
$N^1$-L-tyrosyl-$N^2$-(2,3,4-trihydroxybenzyl)-hydrazide or pharmaceutically acceptable salts thereof.

Other suitable decarboxylase inhibitors are, for example, benzylideneacetophenone, L-3-(3,4-dihydroxyphenyl)-2-methylalanine and compounds of the general formula

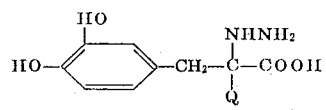

wherein Q is hydrogen or lower alkyl containing 1 to 7 carbon atoms

Where the pharmaceutical preparations contain a decarboxylase inhibitor, the weight ratio of active ingredient to decarboxylase inhibitor expediently amounts to about 1:1 to 10:1.

Where the pharmaceutical preparations contain a decarboxylase inhibitor, the decarboxylase inhibitor can be admixed with the active ingredient and/or with the carrier materials or the preparations can be manufactured by compressing the active ingredient, optionally with a carrier material, to a core, providing this core with a coating which is resistant to gastric juices and applying thereover an external layer which contains the decarboxylase inhibitor. In this manner there is provided a pharmaceutical preparation from which, after oral administration, the active ingredient is released with delay after the decarboxylase inhibitor has been released, preferably about 30 to 60 minutes after the decarboxylase inhibitor. This has proved to be especially expedient. In the case of parenteral administration, the decarboxylase inhibitor is expediently administered first, preferably intravenously, and the active ingredient is administered about 30 to 60 minutes thereafter.

In the treatment of Parkinsonism, the active ingredient, optionally in combination with a peripheral decarboxylase inhibitor, can be administered either orally or parenterally, especially intravenously.

The amount of active ingredient to be administered per day depends on the particular case. In general, an amount of active ingredient of about 0.1 to about 4 g., especially about 1.5 to about 3 g., will be administered orally per day. In the case of intravenous administration, the amount of active ingredient administered per day can lie between about 10 mg. and about 2 g., especially about 1 g.

As has already been mentioned, the amount of active ingredient to be administered can be decreased by the combined administration thereof with a peripheral decarboxylase inhibitor. With such a combined administration there are expediently used amounts of active ingredient which lie in the lower part of the ranges mentioned earlier. For example, 1 g. of active ingredient and 100 mg. of a decarboxylase inhibitor (ratio 10:1) or 500 mg. of active ingredient and 500 mg. of a decarboxylase inhibitor (ratio 1:1) can be administered orally per day.

The administration is expediently effected in individual doses divided over the day.

The following examples illustrate the process provided by the invention.

Example 1

An aqueous, alkaline solution containing the boric acid complex of N-benzyloxycarbonyl-L-dopa is brought to pH 1 with 6-N aqueous sulfuric acid with ice cooling in an argon atmosphere and then extracted twice with 1000 ml. of diethyl ether each time. The organic extracts are washed four times with 500 ml. of water each time, combined and dried over sodium sulfate and animal charcoal. The dried extract is evaporated under reduced pressure with the addition of toluene. Crude N-benzyloxycarbonyl-L-dopa is obtained as a weakly violet-colored glass. For characterization, the product obtained is converted into O,O-diacetyl-N-benzyloxycarbonyl-L-dopa with acetic anhydride in aqueous caustic soda. Melting point 111°–113°C., $[\alpha]_D^{25} = +6.4°$ (c = 1% in alkanol).

Example 2

77 g. (0.391 mol) of L-dopa are added, with stirring in an argon atmosphere, to a suspension of 140 g. (0.367 mol) of borax in 700 ml. of water. The mixture is stirred for 15 minutes and then brought to pH 9 with 2-N aqueous sodium hydroxide. 77 g. (0.453 mol) of benzyloxycarbonyl chloride are subsequently added in portions of about 4 ml. in the course of 3 hours at between 0°C. and 10°C., the pH of the mixture being held between 9 and 9.5 by the addition of 2-N aqueous sodium hydroxide. After the addition, the mixture is cooled to 0°C. and filtered off from a small amount of undissolved material. The filtrate is extracted twice with 500 ml. of diethyl ether each time. The ether extracts are washed with 100 ml. of water and then discarded. The aqueous-alkaline solution, which contains the boric acid complex of N-benzyloxycarbonyl-L-dopa, is used in the process without isolation of the product.

Example 3

An aqueous, alkaline solution containing the boric acid complex of N-benzyloxycarbonyl-DL-α-methyldopa is acidified to pH 1 with 6-N aqueous sulfuric acid in an argon atmosphere. It is then extracted three times with 300 ml. of ethyl acetate each time. The organic phase is dried over sodium sulfate/activated charcoal and evaporated at 40°C/12 mmHg. After drying under strongly reduced pressure at 50°C., N-benzyloxycarbonyl-DL-α-methyldopa is obtained as a dark oil.

Example 4

42.2 g. (0.20 mol) of DL-α-methyldopa are added with stirring in an argon atmosphere to a suspension of 72 g. (0.192 mol) of borax in 360 ml. of water. The mixture is subsequently adjusted to pH 9 with aqueous 2-N sodium hydroxide. 39.4 g. (0.232 mol) of benzyloxycarbonyl chloride are then added dropwise at 5°C., the pH of the mixture being held between 9 and 9.5 by the simultaneous addition of aqueous 2-N sodium hydroxide. The mixture is stirred at room temperature for a further 2 hours, and washed twice with 200 ml. of ether each time. The aqueous phase obtained, which contains the boric acid complex of N-benzyloxycarbonyl-DL-α-methyldopa, is used in the process without isolation of the product.

Example 5

A mixture of 33.1 g. of N-benzyloxycarbonyl-L-dopa, 19.6 ml. of dicyclohexylamine, 17.1 g. of benzyl bromide and 150 ml. of absolute dimethylformamide is stirred at room temperature for 14 hours. The dicyclohexylamine hydrobromide which precipitates is filtered off. The filtrate is evaporated at 40°C/12 mmHg. The residue is partitioned between 900 ml. of ethyl acetate and 200 ml. of water. The aqueous phase is separated off and re-extracted with 200 ml. of ethyl acetate. The organic extracts are washed twice with 100 ml. of 2-N aqueous hydrochloric acid, twice 100 ml. of water, twice 100 ml. of saturated aqueous sodium bicarbonate solution and twice 100 ml. of water, then combined and, after drying over sodium sulfate, concentrated at 40°C./12 mmHg. N-benzyloxycarbonyl-L-dopa benzyl ester is obtained as a glassy mass; $[\alpha]_D^{25} = -7.3°$ (c = 1% in methanol).

Example 6

The calculated amount of an ethereal diazomethane solution is added dropwise over the course of 1 hour at room temperature to a solution of 33.1 g. of N-benzyloxycarbonyl-L-dopa in 100 ml. of diethyl ether. 2 ml. of glacial acetic acid are then added. The solution is extracted with saturated aqueous sodium bicarbonate solution and, after drying over sodium sulfate, evaporated at 40°C./12 mmHg with the addition of toluene. N-benzyloxycarbonyl-L-dopa methyl ester is obtained.

Example 7

An aqueous, alkaline solution containing the boric acid complex of N-benzyloxycarbonyl-D,L-β-(3,4-dihydroxyphenyl)-α, β, β-trimethylalanine is brought to pH 1 with 6-N aqueous sulfuric acid with ice cooling in an argon atmosphere and extracted twice with 650 ml. of ethyl acetate each time. The organic phases are washed four times with 250 ml. of water each time, combined, and, after drying over sodium sulfate, concentrated at 50°C./20 mmHg. The residual crude N-benzyloxycarbonyl-D,L-β-(3,4-dihydroxyphenyl)-α, β, β-trimethylalanine is recrystallized from ethyl acetate/toluene. Colorless crystals of melting point 194°–197°C. are obtained.

Example 8

50 g. (0.2095 mol) of D,L-β-(3,4-dihydroxyphenyl)-α, β, β-trimethylalanine are added in one portion with stirring in an argon atmosphere to a suspension of 95.0 g. of borax in 430 ml. of water. The mixture is stirred for 10 minutes and then brought to a pH of 10.8 by the addition of 2-N aqueous caustic soda. 74.5 g. of benzyloxycarbonyl chloride and 2-N aqueous caustic soda are then simultaneously added at 30°C. within 3 hours in such a way that the pH of the mixture is always held between 9.5 and 10. The mixture is subsequently stirred at 25°C. for a further 12 hours and then filtered off from the undissolved material. The filtrate is extracted twice with 750 ml. of ether each time. The ether solutions are discarded. The aqueous-alkaline solution, which contains the boric acid complex of N-benzyloxycarbonyl-D,L-β-(3,4-dihydroxyphenyl)-α, β, β-trimethylalanine, is used in the process without isolation of the product.

Example 9

By the procedure of Example 7 the following compounds are prepared:

N-benzyloxycarbonyl-3,4-dihydroxy-6-bromo-L-phenylalanine (violet glass, melting point of the diacetyl derivative 113°–114°C.; $\alpha_D^{25} = -31.9°$) (c = 1% in methanol);

N-benzyloxycarbonyl-2,3-dihydroxy-D,L-phenylalanine, melting point 139°–141°C.

Example 10

An aqueous, alkaline solution containing the boric acid complex of N-benzyloxycarbonyl-5-methoxy-DL-dopa is acidified to pH 2 with 2-N aqueous hydrochloric acid in an argon atmosphere and subsequently extracted three times with ethyl acetate. The organic extracts are washed twice with water and three times with a saturated aqueous sodium chloride solution, dried over magnesium sulfate and concentrated under reduced pressure. After recrystallization from ethyl acetate/diethyl ether, there is obtained N-benzyloxycarbonyl-5-methoxy-DL-dopa of melting point 164°–165°C.

Example 11

6 g. of benzyloxycarbonyl chloride are added dropwise over the course of 2 hours at 5°C. to a mixture of 12.3 g. of borax, 54 ml. of water, 10 ml. of 2-N caustic soda and 7.7 g. of 5-methoxy-DL-dopa hydrochloride, the pH of the mixture being held at 9.0 to 9.5 by the simultaneous addition of 2-N caustic soda. The mixture is then stirred at room temperature for 2 hours and then extracted twice with diethyl ether. The aqueous phase, which contains the boric acid complex of N-benzyloxycarbonyl-5-methoxy-DL-dopa is used in the process without isolation of the product.

Example 12

When 5-methyl-DL-dopa hydrochloride is used in Example 10 in place of 5-methoxy-DL-dopa hydrochloride there is obtained under otherwise similar conditions N-benzyloxycarbonyl-5-methyl-DL-dopa as a violet colored glass. The stated structure is in accord with the NMR and mass spectrum.

Example 13

Tablets of the following composition are manufactured:

| | |
|---|---|
| N-benzyloxycarbonyl-L-dopa | 100 mg. |
| lactose | 61 mg. |
| maize starch | 30 mg. |
| polyvinylpyrrolidone | 4 mg. |
| talcum | 5 mg. |

The active ingredient is mixed with the lactose and the maize starch and, after the addition of a solution of polyvinylpyrrolidone in 40 ml. of ethanol, granulated. The granulate is dried at 30°C., mixed with the talcum and compressed to tablets.

| | |
|---|---|
| Individual weight of one tablet | 200 mg. |
| Active ingredient content of one tablet | 100 mg. |

Example 14

Gelatin capsules containing the following ingredients are manufactured:

| | |
|---|---|
| N-benzyloxycarbonyl-DL-α-methyldopa | 50 mg. |
| mannitol | 98.5 mg. |
| stearic acid | 1.5 mg. |

The ingredients are homogeneously mixed and filled into interlocking gelatin capsules (No. 2) using a capsule filling machine.

| | |
|---|---|
| Individual weight of one capsule | 150 mg. |
| Active ingredient content of one capsule | 50 mg. |

We claim:
1. A compound of the formula

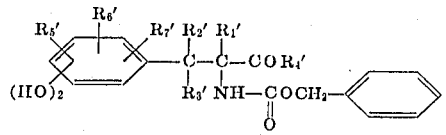

wherein $R_1'$, $R_2'$ and $R_3'$ individually are hydrogen or $C_{1-7}$ alkyl; $R_4'$ is hydroxy, $C_{1-7}$ alkoxy, or phenyl-$C_{1-7}$ alkoxy; $R_5'$ or $R_6'$ and $R_7'$ are hydrogen, halogen, $C_{1-7}$ alkyl, or $C_{1-7}$ alkoxy; and the two phenolic hydroxy groups are ortho to each other and with the proviso that at least one of $R_1'$, $R_2'$, $R_3'$, $R_5'$, $R_6'$ and $R_7'$ is other than hydrogen when $R_4'$ is hydroxy or pharmaceutically acceptable salts thereof.

2. The compound of claim 1 wherein $R_1'$, $R_2'$, $R_3'$, $R_5'$, $R_6'$ and $R_7'$ are hydrogen.

3. The compound of claim 2 wherein said compound is N-benzyloxycarbonyl-L-dopa benzyl ester.

4. The compound of claim 2 wherein said compound is N-benzyloxycarbonyl L-dopa methyl ester.

5. The compound of claim 1 wherein at least one of $R_5'$, $R_6'$ and $R_7'$ is halogen.

6. The compound of claim 5 wherein said compound is N-benzyloxycarbonyl-3,4-dihydroxy-6-bromo-L-phenylalanine.

7. The compound of claim 1 wherein at least one of $R_5'$, $R_{d\,6}'$ or $R_7'$ is alkoxy.

8. The compound of claim 7 wherein said compound is N-benzyloxycarbonyl-5-methoxy-D,L-dopa.

9. The compound of claim 1 wherein at least one of $R_1'$, $R_2'$ or $R_3'$ is alkyl.

10. The compound of claim 9 wherein said compound is N-benzyloxycarbonyl-D,L-α-methyl dopa.

11. The compound of claim 9 wherein said compound is N-benzyloxycarbonyl-D,L-β-(3,4-dihydroxyphenyl)-α, β, β, -trimethylalanine.

12. A process for preparing a compound of the formula

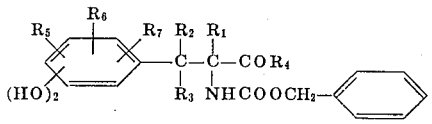

wherein $R_1$, $R_2$ and $R_3$ are $C_{1-7}$ alkyl or hydrogen; $R_4$ is hydroxy, $C_{1-7}$ alkoxy, or phenyl $C_{1-7}$ alkoxy; $R_5$, $R_6$ and $R_7$ are hydrogen, halogen, $C_{1-7}$ alkyl or $C_{1-7}$ alkoxy, and the two phenolic hydroxy groups being ortho to each other with the proviso that when $R_1$, $R_2$, $R_3$, $R_5$, $R_6$ and $R_7$ are hydrogen and $R_4$ is hydroxy, the compound is in the L-form or pharmaceutically acceptable salts thereof, consisting essentially of subjecting a boric acid complex of the formula

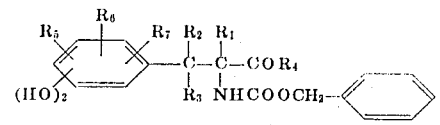

wherein $R_1$, $R_2$, $R_3$, $R_4$, $R_5$, $R_6$ and $R_7$ are as above, and the two phenolic hydroxy groups are ortho to each other and esterified with boric acid, and with the proviso that when $R_1$, $R_2$, $R_3$, $R_5$, $R_6$ and $R_7$ are hydrogen and $R_4$ is hydroxy the compound is in the L-form;

or pharmaceutically acceptable salts thereof, to acid hydrolysis in an aqueous solution at a temperature between 0°C. and about 70°C. and a pH of about 1-4.

* * * * *

UNITED STATES PATENT OFFICE
CERTIFICATE OF CORRECTION

PATENT NO. 3,846,476

DATED : July 1, 1974

INVENTOR(S) : Ado Kaiser, Wolfgang Koch, Marcel Scheer and Uwe Wolcke

It is certified that error appears in the above-identified patent and that said Letters Patent are hereby corrected as shown below:

Column 13, line 13, claim 7 "$R_{d\ 6'}$" should be:

$$\underline{R_{6'}}$$

Signed and Sealed this twentieth Day of April 1976

[SEAL]

Attest:

RUTH C. MASON
*Attesting Officer*

C. MARSHALL DANN
*Commissioner of Patents and Trademarks*